(12) United States Patent
Dunning et al.

(10) Patent No.: US 6,683,850 B1
(45) Date of Patent: *Jan. 27, 2004

(54) METHOD AND APPARATUS FOR CONTROLLING THE FLOW OF DATA BETWEEN SERVERS

(75) Inventors: David S. Dunning, Portland, OR (US); Ken Drottar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/141,151

(22) Filed: Aug. 27, 1998

Related U.S. Application Data

(60) Provisional application No. 60/081,220, filed on Apr. 9, 1998, and provisional application No. 60/057,221, filed on Aug. 29, 1997.

(51) Int. Cl.[7] .................................................. H04L 1/08
(52) U.S. Cl. ........................................ 370/231; 370/229
(58) Field of Search ................................ 370/410, 231, 370/236, 400, 230, 232, 357, 389, 390, 412, 428, 216, 228, 237

(56) References Cited

U.S. PATENT DOCUMENTS

| | | | |
|---|---|---|---|
| 4,439,859 A | | 3/1984 | Donnan |
| 4,617,657 A | * | 10/1986 | Drynan et al. |
| 4,726,027 A | * | 2/1988 | Nakamura et al. ............ 371/32 |
| 4,841,526 A | | 6/1989 | Wilson et al. |
| 4,860,292 A | | 8/1989 | Newman et al. |
| 5,146,452 A | | 9/1992 | Pekarske |
| 5,222,061 A | * | 6/1993 | Doshi |
| 5,260,933 A | | 11/1993 | Rouse ........................ 370/216 |
| 5,303,234 A | * | 4/1994 | Kou |
| 5,398,236 A | | 3/1995 | Hemmaday et al. |
| 5,459,725 A | | 10/1995 | Bodner et al. .............. 370/390 |
| 5,483,545 A | | 1/1996 | Darmon et al. |
| 5,701,311 A | * | 12/1997 | Kapoor |
| 5,754,754 A | | 5/1998 | Dudley et al. |
| 5,809,025 A | | 9/1998 | Timbs ........................ 370/400 |
| 5,875,292 A | * | 2/1999 | Taketsugu |
| 5,933,435 A | | 8/1999 | Shah et al. ................. 714/749 |
| 5,959,995 A | * | 9/1999 | Wicki et al. |
| 6,111,853 A | | 8/2000 | Goodman |
| 6,275,471 B1 | * | 8/2001 | Bushmitch et al. ......... 370/248 |
| 6,292,470 B1 | * | 9/2001 | Uota .......................... 370/252 |

OTHER PUBLICATIONS

Tezuka et al., "PM: A High–Performance Communication Libary for Multi–user Parallel Environments," TR–96–015, pp. 1–16, Nov. 11, 1996.
Rosberg et al., "Resequencing Delay and Buffer Occupancy Under the Selective Repeat ARQ," IEEE, pp. 166–173, Jan. 1989.
Pakin et al., "High Performance Messaging on Workstations: Illinois Fast Messages (FM) for Myrinet," Association for Computing Machinery (ACM), pp. 1–22, 1995.

* cited by examiner

*Primary Examiner*—Kenneth Vanderpuye
(74) *Attorney, Agent, or Firm*—Kenyon & Kenyon

(57) ABSTRACT

Link-based flow control requires each link transmitter to retain packets until such time as they are acknowledged by the link receiver. Depending on the type of acknowledge, the transmitter will then either retry or de-allocate the packets. The NG I/O flow control of the present invention is credit based. At power up, each end of a link determines buffer size, deferring to the smaller implemented buffer if size is different. A transmitter will not send a packet unless buffer space at the receiver is available. Transmitter and receiver also synchronize on width of the link ID counter. Each link transmitter assigns an ordered ID (beginning with zero) to each sent packet. The link receiver tests the checksum of each delivered packet. If the packet tests with no error, the receiver sends a positive acknowledge (ACK) back to the transmitter. Flow control is either contained in its own packet or is appended to a packet assembling for transmission back. Some period of time can be consumed while the receiver attempts to acknowledge the transmitter. In the interests of efficiency, a receiver can ACK out-of-order to de-allocate buffer space for the named transaction and any other sequentially previous transactions outstanding at the transmitter. In exchange for this performance benefits, the receiver assumes responsibility for tracking transmit ID sequence. This audition activity reduces the opportunity for undetected packets. In the case of negative acknowledge (NAK), the transmitter may still de-allocate for sequentially previous transactions. NAK instructs the transmitter to resend the indicated packet and any packets that have been sent since then. Each transmitter has a configurable interval timer for the link acknowledge cycle. Each transmitter has a configurable iteration counter for NAK. Rather than congest the link, a transmitter that has run through either counter is obliged to return the undeliverable packet to its source.

10 Claims, 13 Drawing Sheets

METHOD AND APPARATUS FOR CONTROLLING THE FLOW OF DATA BETWEEN SERVERS

RELATED APPLICATIONS

This application claims priority to U.S. Provisional Application No. 60/057,221, filed on Aug. 29, 1997, entitled "Method and Apparatus for Communicating Between Interconnected Computers, Storage Systems, and Other Input/Output Subsystems" by inventors Ahmet Houssein, Paul A. Grun, Kenneth R. Drottar, and David S. Dunning, and to U.S. Provisional Application No. 60/081,220, filed on Apr. 9, 1998, entitled "Next Generation Input/Output" by inventors Christopher Dodd, Ahmet Houssein, Paul A. Grun, Kenneth R. Drottar, and David S. Dunning. These applications are hereby incorporated by reference as if repeated herein in their entirety, including the drawings. Furthermore, this application is related to U.S. patent application Ser. No. 09/141,134 filed by David S. Dunning and Kenneth R. Drottar on even date herewith and entitled "Method and Apparatus for Controlling the Flow of Data Between Servers Using Optimistic Transmitter." This application is also related to U.S. patent application Ser. No. 09/141,136 filed by Ken Drottar, David S. Dunning and Donald F. Cameron on even date herewith and entitled "Method and Apparatus for Input/Output Link Retry, Failure and Recovery in a Computer Network." This application is also related to U.S. patent application Ser. No. 09/141,158 filed by Ken Drottar, David S. Dunning, and Donald F. Cameron on even date herewith and entitled "Method and Apparatus for Failure Recovery in a Computer Network."

BACKGROUND OF THE INVENTION

The present invention relates generally to methods and apparatuses for controlling the flow of data between two nodes in a computer network, and more particularly to a method and apparatus for controlling the flow of data between two nodes in a system area network.

As used herein, nodes refer to endpoints of a communication path, i.e., the origination and termination of messages. For example, an origination node could be a request for a data file from a user computer, and a terminal node could be a server coupled to the user's computer via a network, either public or private, to which the request is directed. All points along the communication path are termed intermediate points, or simply points, for purposes of this application. A link includes two points coupled together.

An existing flow control protocol, known as Stop and Wait ARQ, transmits a data packet and then waits for an acknowledgment (ACK) before transmitting the next packet. As data packets flow through a network from point to point, latency becomes a problem. Latency results from the large number of links in the fabric because each link requires an acknowledgment of successful receipt from the receiving node for each data packet before the next data packet is sent from the transmitting node. Consequently, there is an inherent delay resulting from the transit time for the acknowledgment to reach the transmitting node from the receiving node.

One solution, which is known as Go Back n ARQ, uses sequentially numbered packets, in which a sequence number is sent in the header of the frame containing the packet. In this case, several successive packets are sent without waiting for the return of the acknowledgment. According to this protocol, the receiver only accepts the packets in the correct order and sends request numbers (RN) back to the transmitting node. The effect of a given request number is to acknowledge all packets prior to the requested packet and to request transmission of the packet associated with the request number. The go back number n is a parameter that determines how many successive packets can be sent from the transmitter in the absence of a request for a new packet. Specifically, the transmitting node is not allowed to send packet i+n before i has been acknowledged (i.e., before i+1 has been requested). Thus, if i is the most recently received request from the receiving node, there is a window of n packets that the transmitter is allowed to send before receiving the next acknowledgment. In this protocol, if there is an error, the entire window must be resent as the receiver will only permit reception of the packets in order. Thus, even if the error lies near the end of the window, the entire window must be retransmitted. This protocol is most suitable for large scaled networks having high probabilities of error.

In an architecture that permits large data packets, unnecessarily retransmitting excess packets can become a significant efficiency concern. For example, retransmitting an entire window of data packets, each on the order of 4 Gigabytes, would be relatively inefficient.

Other known flow control protocols require retransmission of only the packet received in error. This requires the receiver to maintain a buffer of the correctly received packets and to reorder them upon successful receipt of the retransmitted packet. While keeping the bandwidth requirements to a minimum, this protocol significantly complicates the receiver design as compared to that required by Go Back n ARQ.

The present invention is therefore directed to the problem of developing a method and apparatus for controlling the flow of data between nodes in a system area network that improves the efficiency of the communication without overly complicating the processing at the receiving end.

SUMMARY OF THE INVENTION

The present invention provides a method for transmitting data between switches in a fabric having a plurality of links. The method includes the steps of transmitting the data in a plurality of packets from point to point, and retaining each packet in a buffer at a transmitting point until receiving either an acknowledgment indicating that each packet was successfully received at the next point or an error indication that a received version of each packet included at least one error, while simultaneously transmitting additional packets to the next point. The method further includes the step of indicating successful receipt of all packets between a last acknowledged packet and a particular packet by sending a single acknowledgment.

According to one exemplary embodiment of the present invention, an apparatus is provided for communicating data between two points in a fabric, including a plurality of links. The apparatus includes a first switch that is disposed in a first point of a link. The first switch transmits the data in a plurality of packets from the first point in the link to a second point in the link. The apparatus also includes a buffer disposed in the first node, which buffer is coupled to the first switch. The buffer stores each packet until receiving either an acknowledgment that each packet was successfully received or an error indication that a received version of each packet included at least one error. The apparatus further includes a second switch that is disposed in the second point. The second switch receives each of the transmitted data packets, and upon receipt of an error free packet, the second switch sends an acknowledgment to indicate successful receipt of the error free packet and all packets in sequence between a last acknowledged packet and the error free packet.

DETAILED DESCRIPTION

Figure 1:
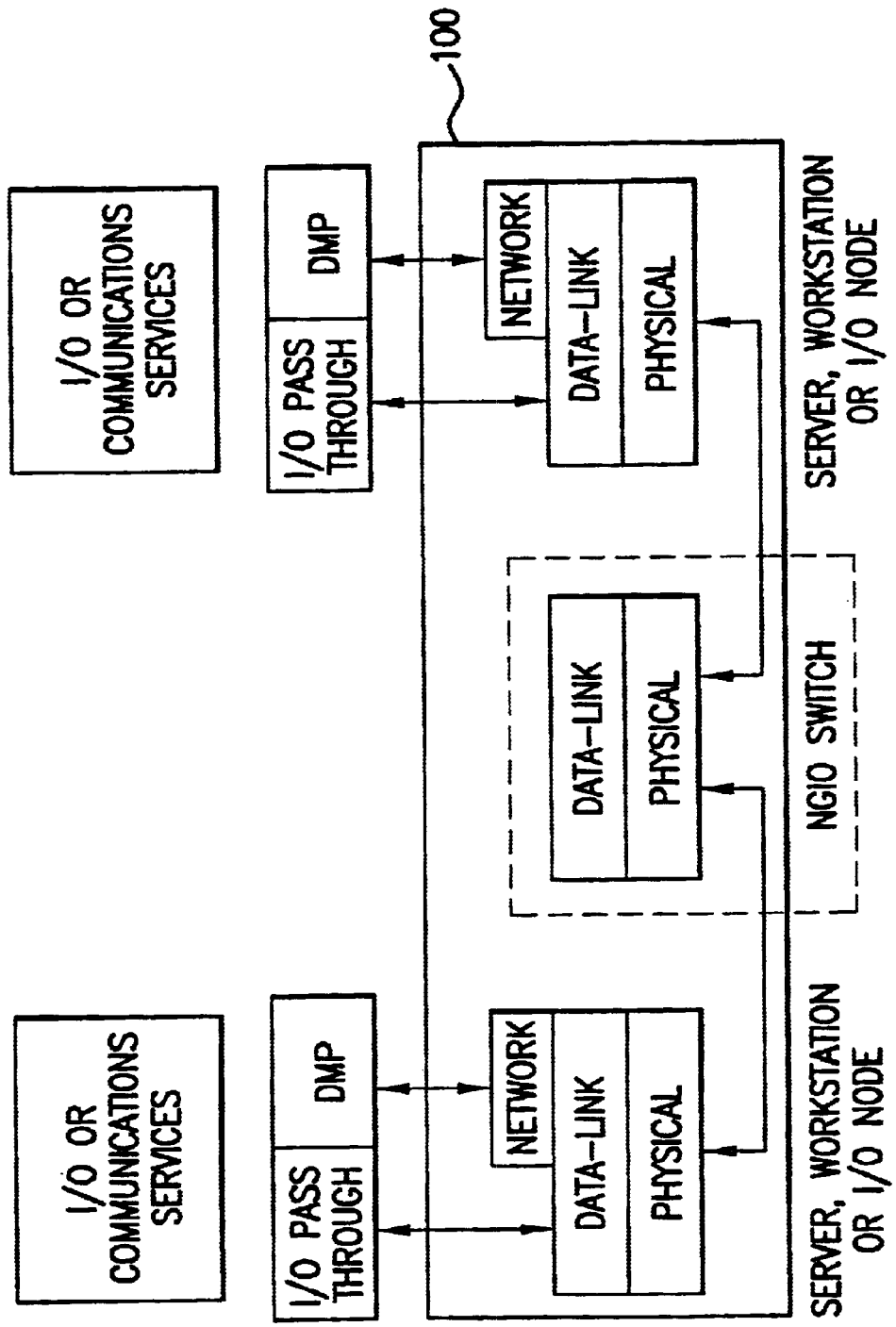
FIG. 1 depicts a block diagram of an NG I/O Architecture according to one exemplary embodiment of the present invention.

In the Next Generation Input/Output architecture (NG I/O, which is defined below), which is generally a system area network, a cell is the smallest indivisible data unit on a wire. Each cell comprises 292 bytes. A data packet can include up to 4 Gigabytes −1 byte (i.e., about 13,700,000 cells). Therefore, efficiency in retransmission of packets is a significant concern, along with latency.

The present invention provides a method for transmitting data between switches in a fabric having a plurality of links, which includes the steps of transmitting the data in a plurality of packets from point to point, and retaining each packet in a buffer at a transmitting point until receiving either an acknowledgment indicating that each packet was successfully received or an error indication that a received version of each packet included at least one error, while simultaneously transmitting additional packets. According to the present invention, successful receipt of all packets between the last acknowledged packet and a particular packet is indicated by sending a single acknowledgment. According to another aspect of the present invention, a single negative acknowledgment is used to indicate that a packet associated with the negative acknowledgment includes at least one error and to simultaneously indicate that all previous packets received prior to the packet associated with the negative acknowledgment were received correctly. The present invention provides a method and apparatus for controlling the flow of data in a system area network that takes advantage of the context in which the method and apparatus will be used. If the packet received in error lies in the first half of the window, only that portion of the data stream following the error is retransmitted, rather than the entire window, as in the prior art. Furthermore, positive acknowledgments are not required for each and every packet, thereby improving latency.

The flow control of the present invention is intended for use in Next Generation Input/Output (NG I/O) systems. The following terms are defined for subsequent use throughout the specification:

The following terms are used herein:

| | |
|---|---|
| NG I/O fabric | The set of switches and wires, along with the protocol that runs over them, that comprise a method of interconnecting two or more computer nodes, storage subsystems, or other network-attached devices. |
| NG/IO architecture | An umbrella term describing the overall concept behind a system implemented with NG I/O elements. |
| I/O pass through | A method of connecting I/O devices to a computer node, or connecting two computer nodes together, based on load/store memory transactions. An interconnect based on I/O pass through is said to be transparent to the entities at either end of the interconnect. |
| DMP (Distributed Message Passing) | An interconnect method that allows two entities to communicate via a series of messages passed between them. |
| NG I/O (physical) link | The minimum set of wires and the protocol that runs on them that interconnect two entities. For example, the wires and protocol connecting a computer node to a switch comprise a link. |
| NG I/O bundled link | Refers to the capability to connect two or more NG I/O links together in parallel. Such bundled links can be used to gain increased bandwidth or improve the overall reliability of a given link. |
| NIC | Network Interface Card |
| NG I/O | Next Generation I/O |
| Switch | An NG I/O device that is capable of receiving NG I/O packets through one or more ports and re-transmitting those packets through another port based on a destination address contained in the packet. In network terms, a switch operates at the data link layer. |

Overview

Referring to FIG. 1, the highlighted area 100 shows one possible scope of the Next Generation Input/Output (NG/I/O) architecture. An NG I/O switch can encompass both the physical layer and the data link layer.

Figure 2:
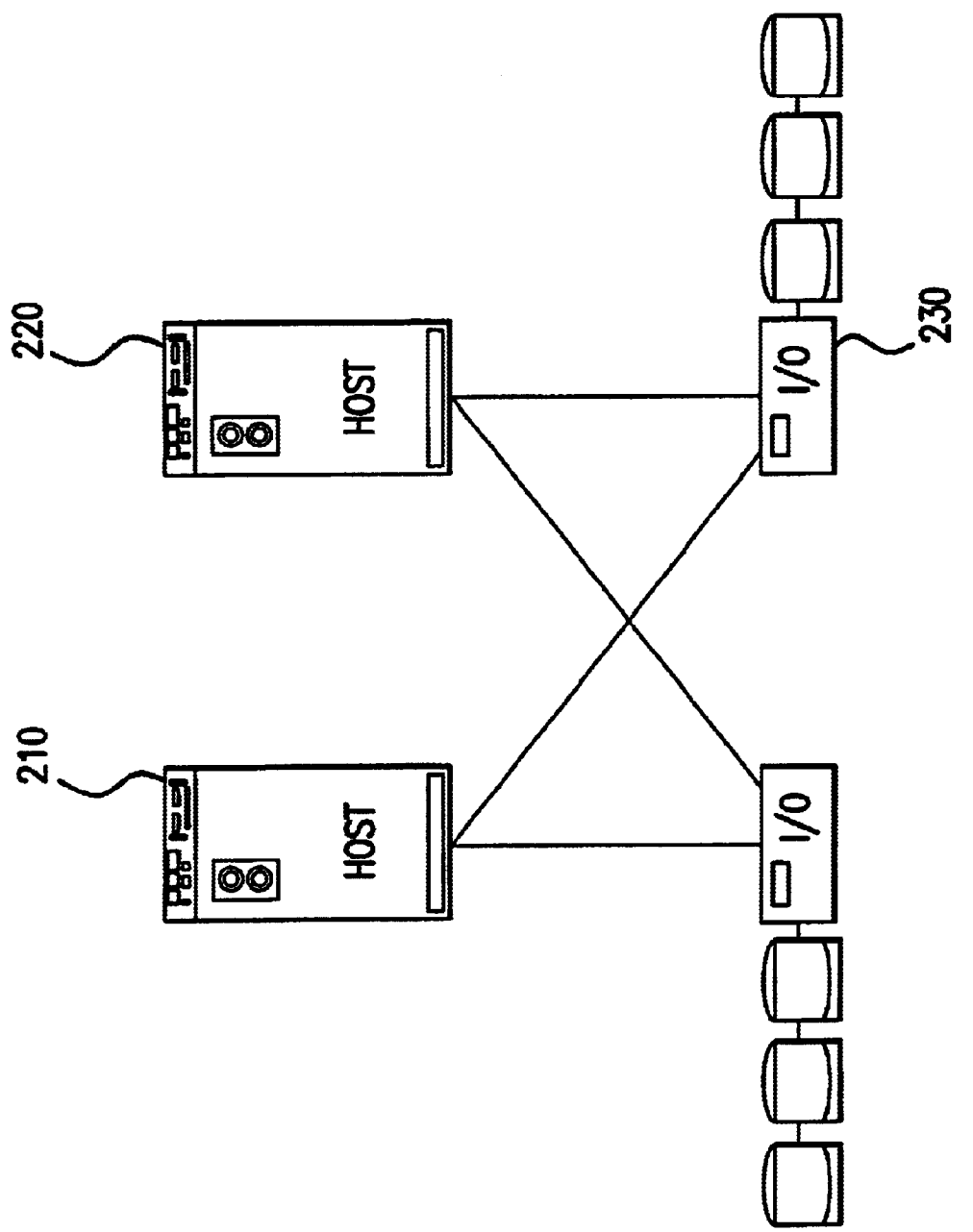
FIG. 2 depicts a physically shared disk programming model according to one exemplary embodiment of the present invention.

For example, in FIG. 2, under the NG I/O architecture physically shared disk programming model of the present invention, multiple hosts nodes 210, 220 can physically share a single I/O device 230.

Figure 3:
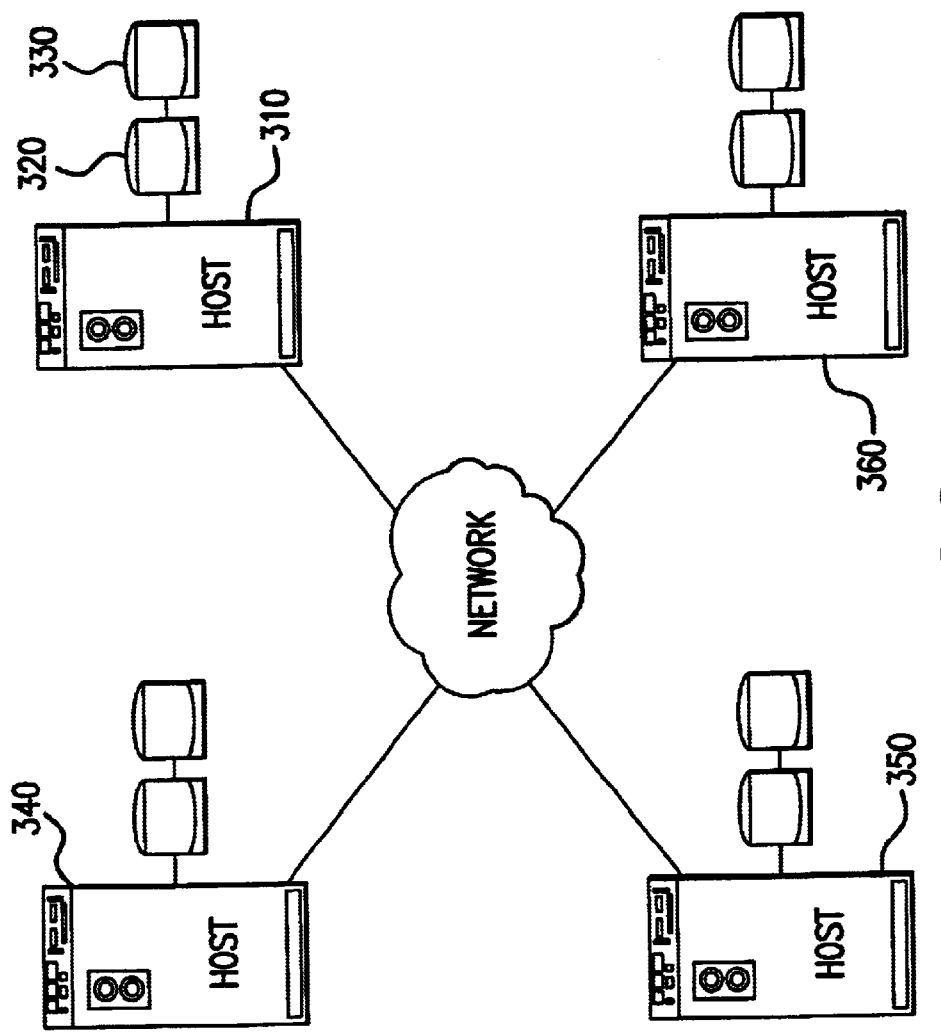
FIG. 3 depicts input/output and function shipping system models according to one exemplary embodiment of the present invention.

Referring to FIG. 3, under the NG I/O architecture I/O shipping and function shipping programming models, a host node 310 with locally attached I/O devices 320, 330 shares those devices with its peers 340, 350, 360 via a layer of software, according to one aspect of the present invention. A host requests data from a peer; the peer handles the I/O locally and ships it on to the host requesting the data. The function shipping model is similar except that the host node that supplies the data also performs a significant amount of processing on that data before the results are shipped back to the requester. I/O shipping and function shipping can be thought of as logically shared disk, in that multiple application processes are logically sharing a physical I/O device.

Figure 4:
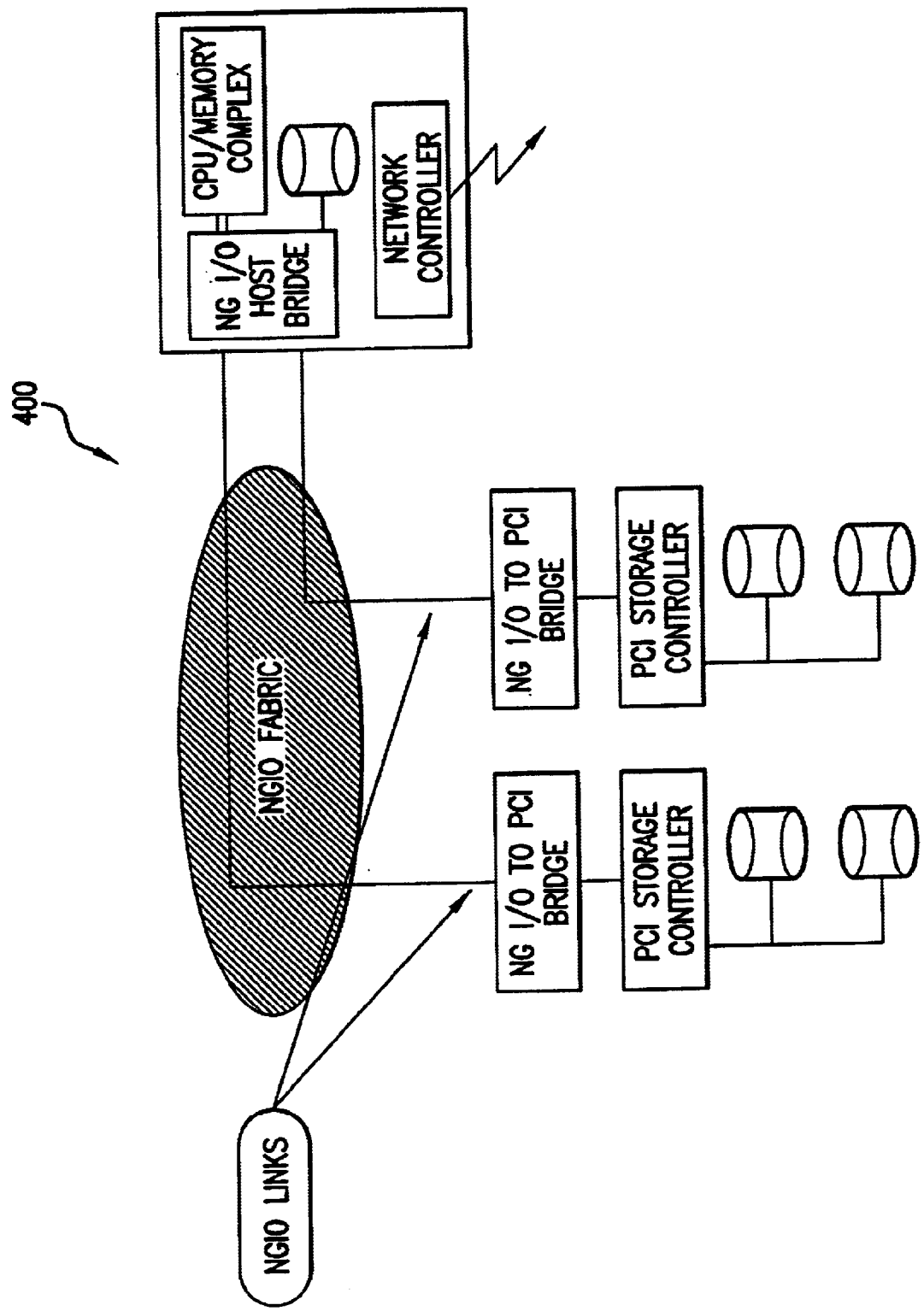
FIG. 4 illustrates one embodiment of a single server NG I/O fabric according to one exemplary embodiment of the present invention.

FIG. 4 illustrates one embodiment of a Single Server Fabric 400 according to one aspect of the present invention. The Single Server Fabric 400 includes an NG I/O system comprising a single host node, and a simple I/O subsystem. In this diagram, the I/O subsystem consists of an NG I/O host bridge, an NG I/O to PCI bridge device, and NG I/O links comprising the fabric. This diagram illustrates that an NG I/O fabric can be used to move storage devices out of the server cabinet, and that an NG I/O fabric is applicable for simple point-to-point connections.

Figure 5:
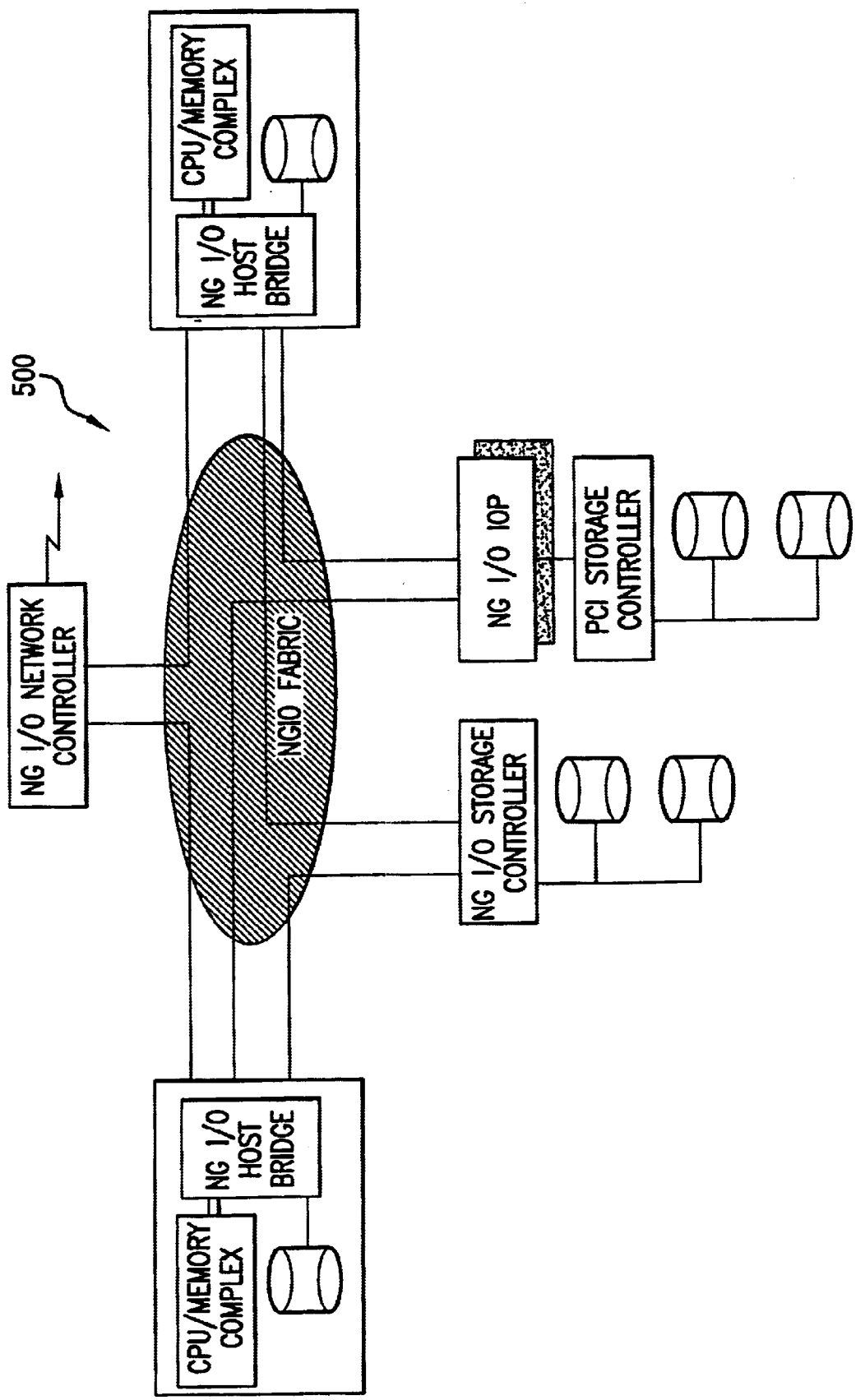
FIG. 5 illustrates one exemplary embodiment of a cluster system using NG I/O fabric according to the present invention.

FIG. 5 illustrates one embodiment of a Simple Cluster System 500 according to another aspect of the present invention. The system depicted in FIG. 5 shows two servers using an NG I/O fabric to share access to an I/O subsystem. In this case, the "fabric" is comprised of a number of point-to-point links implemented by the host bridges on each server node. This diagram also shows an NG I/O based I/O Processor (IOP) 510 for Intelligent I/O (120) applications, and introduces the notion of storage controllers designed for direct connection to an NG I/O fabric, obviating the need for an NG I/O to PCI bridge component.

Figure 6:
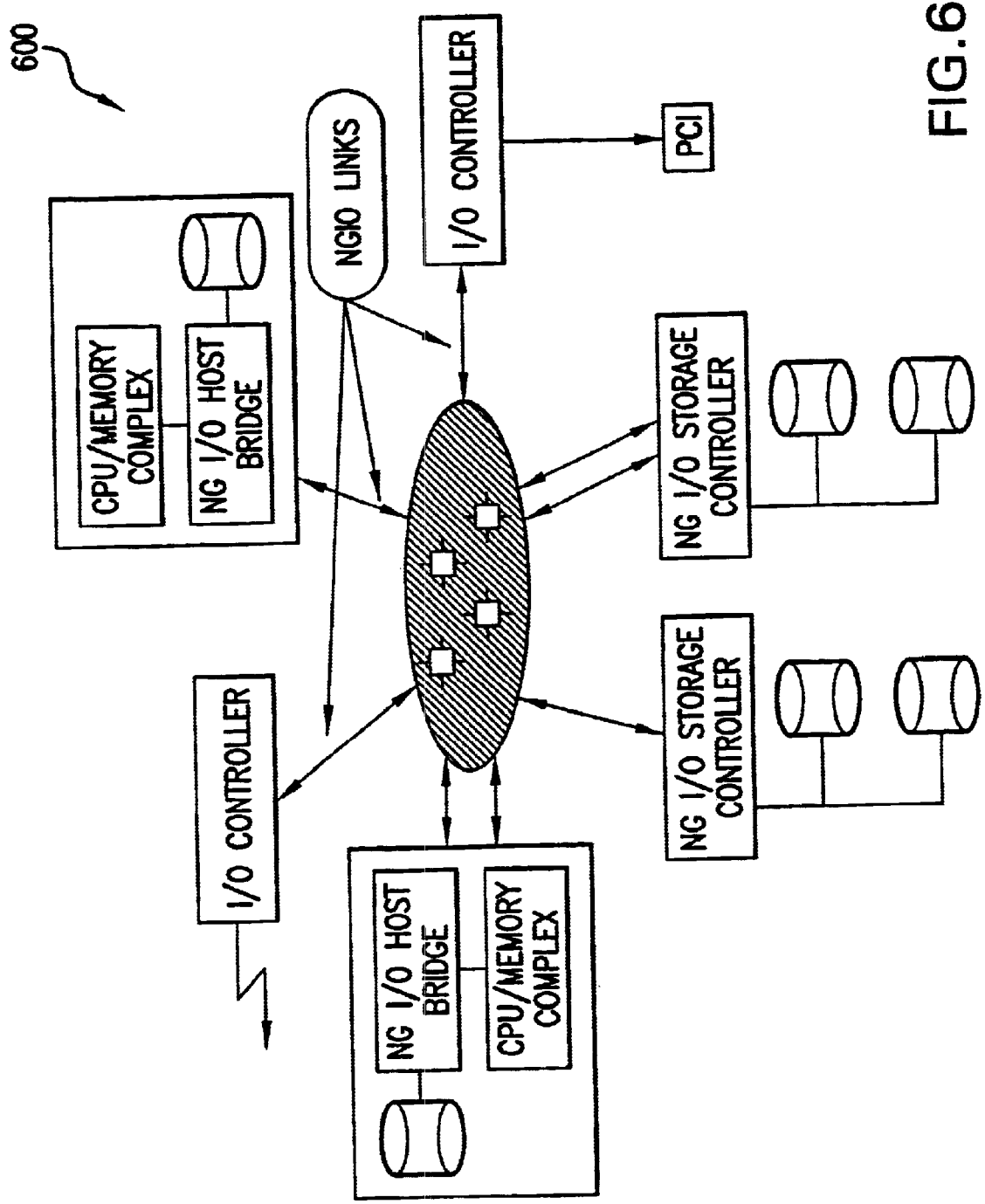
FIG. 6 illustrates one exemplary embodiment of an NG I/O-based cluster system according to the present invention.

FIG. 6 depicts a larger system 600 comprised of a cluster of nodes according to another aspect of the present invention. The distinction is that the nodes are interconnected via an NG I/O switched fabric which provides an increase in connectivity. Also connected to the switch are storage devices and network line cards.

Figure 7:
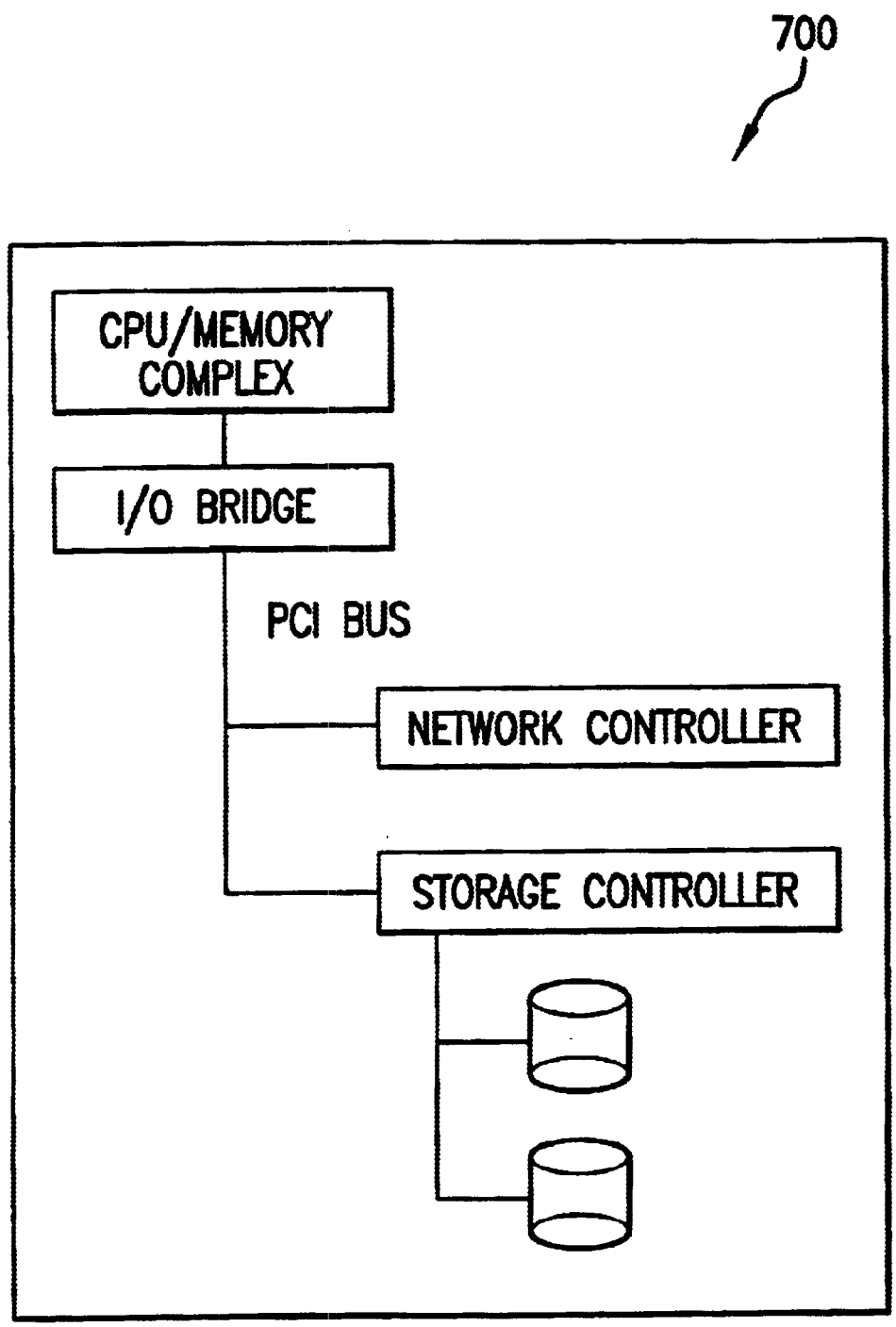
FIG. 7 illustrates the general architectural model for current generation servers.

FIG. 7 illustrates what is referred to as the Current System Model 700. FIG. 7 illustrates the general architectural model for current generation servers, and is included here to be used for comparison with the two next generation usage models of the present invention, as described below. In the current model, I/O devices are connected to the host node via one or more PCI buses and a series of bridges. Generally, these configurations are limited by the PCI bus, which imposes limits both on the number of electrical loads it is capable of supporting and the physical distances at which devices can be placed. The salient point of FIG. 7 is that storage connectivity and proximity are generally restricted to what fits within a single enclosure.

Figure 8:
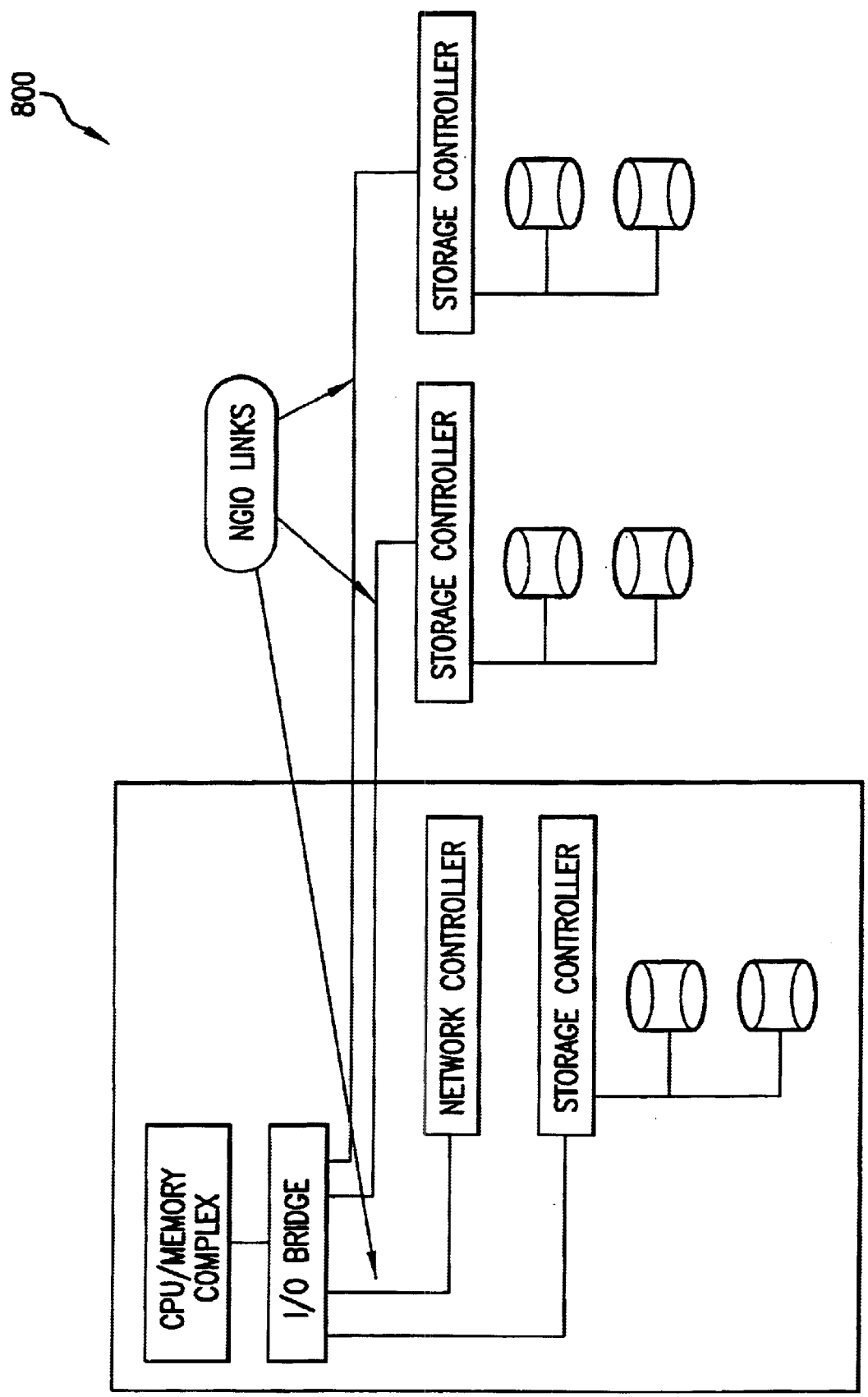
FIG. 8 illustrates one exemplary embodiment of an NG I/O-based Single Server Model according to the present invention.

FIG. 8 illustrates an NG I/O-based Single Server Model 800 according to one aspect of the present invention. FIG. 8 differs from the current system model shown in FIG. 7 in that NG I/O has been introduced into the picture. This allows the storage complex to be physically removed from the server node box, leading to greater connectivity and thus higher overall system throughput. This is the environment for which I/O pass through operations over an NG I/O fabric are intended. Note that even though it is not explicitly shown in the diagram, a switched NG I/O fabric can be substituted for the point-to-point links shown. Common to I/O pass through operations are several characteristics, including the notion of a single shared address space domain, I/O operations based on load and store transactions, and a single host sever node. Essentially, operations based on implicit transactions allow a physical extension of the standard load and store based I/O subsystem. Physically extending the I/O subsystem provides greater flexibility in initial system design and future upgrades by separating the processor and memory modules from the I/O subsystem. Although physically separate, the I/O platform appears logically integrated. The single physical address space includes expansion regions for the host and exported I/O platform address maps, including the traditional memory and I/O spaces. A mechanism is also provided to access PCI-compatible configuration space on each device installed in the I/O platform.

Figure 9:
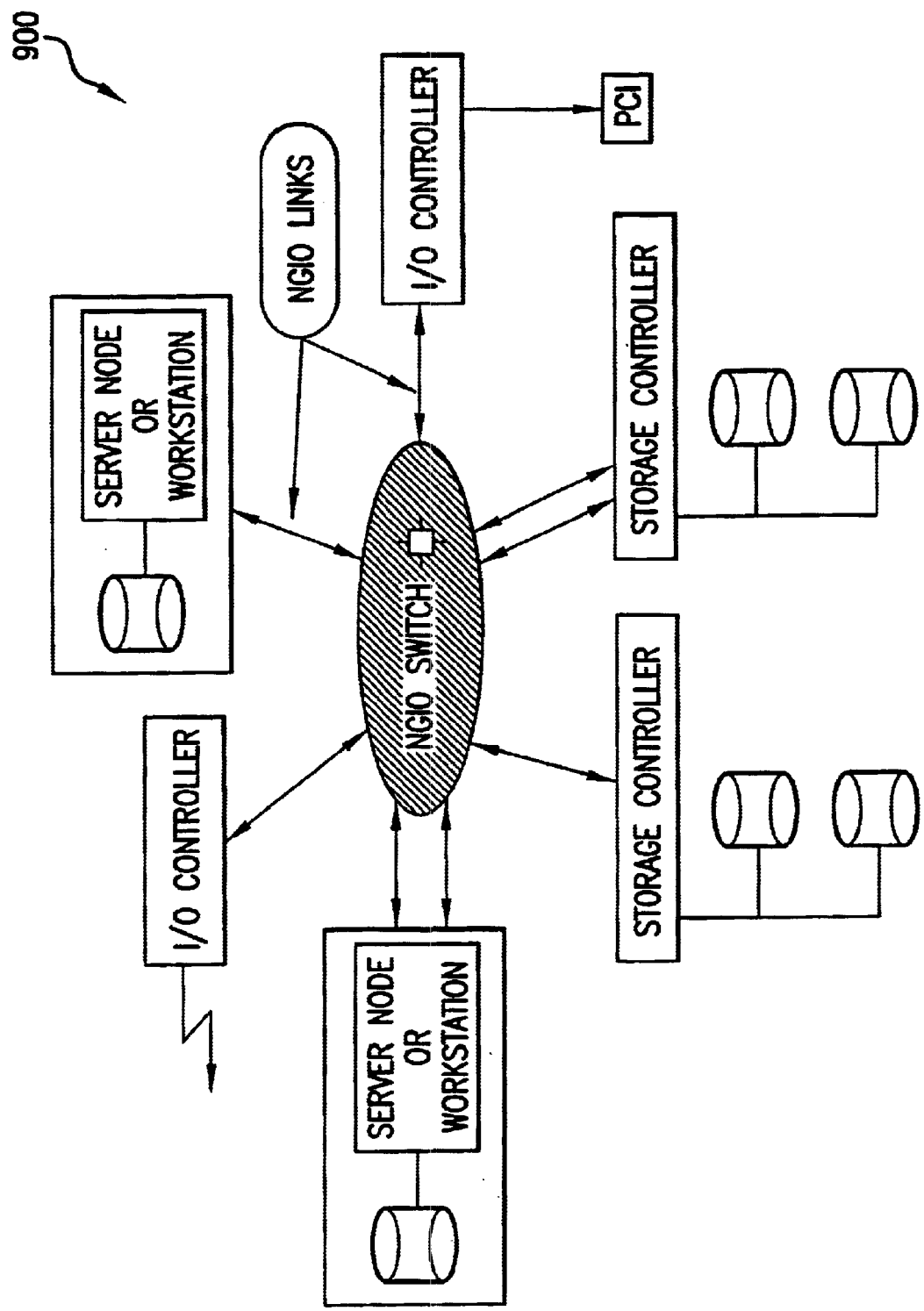
FIG. 9 illustrates one exemplary embodiment of an NG I/O-based Cluster Attachment Model according to the present invention.

A shared-disk, DMP-based cluster such as the NG I/O-Based Cluster Attachment 900 according to one aspect of the present invention, which is illustrated in FIG. 9, consists of nodes connected by a fabric. The nodes can be host nodes of I/O nodes. Host nodes are optimized to run application processes while I/O nodes are optimized for I/O. The interconnect supports message-based transfers between any combination of host and I/O nodes, including host-to-host (IPC), host-to-I/O, and I/O-to-I/O.

Figure 10:
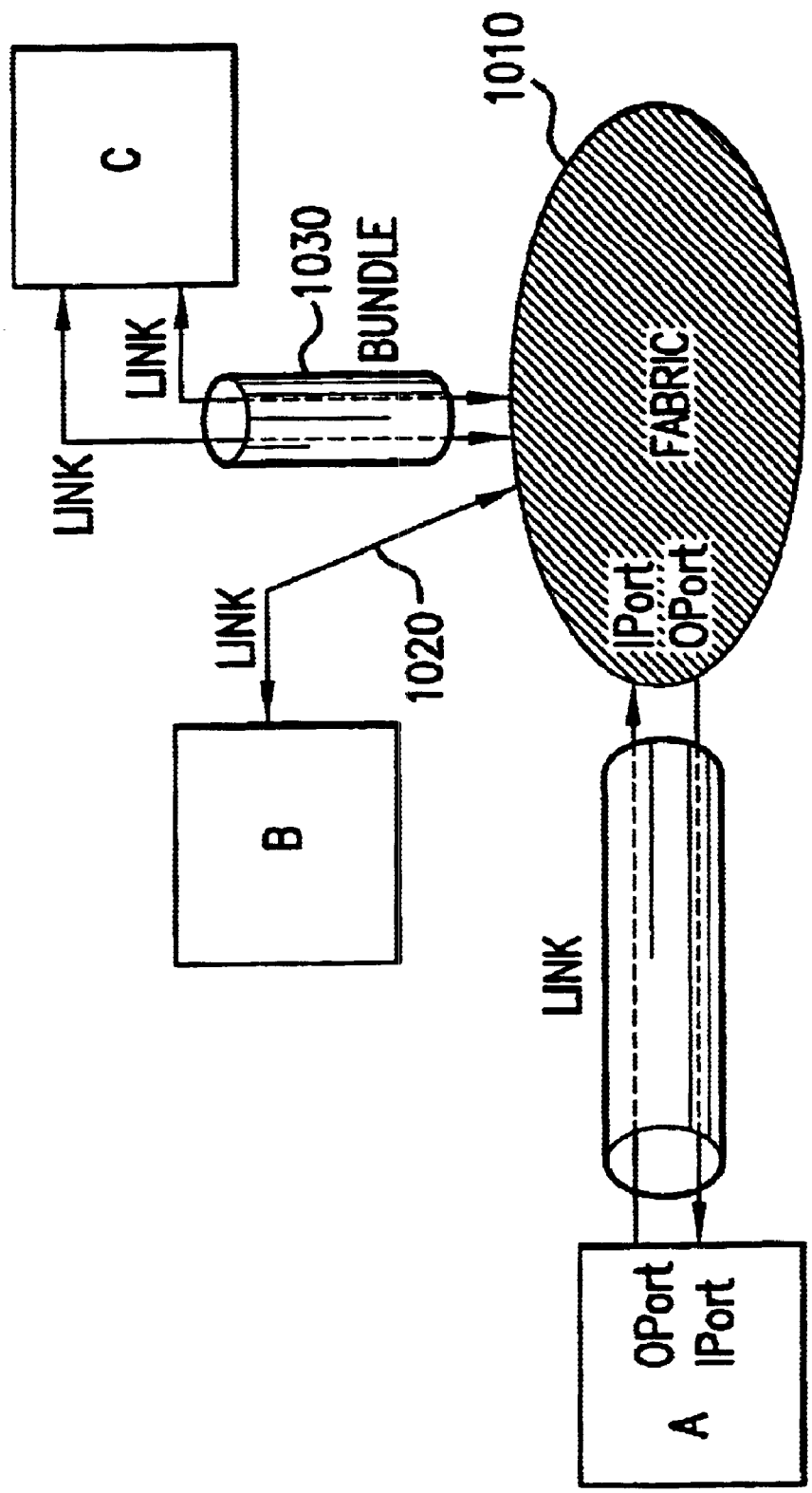
FIG. 10 illustrates various examples of NG I/O links, to which the present invention is applicable.

NG I/O is the protocol, hardware, and software that facilitate communication between network attached devices according to the present invention, which is illustrated in FIG. 10. A fabric 1010 is a set of modules or components connected such that two or more participants can exchange control and data. A link 1020 is a bi-directional communication path between two NG I/O connect points in a fabric. An NG I/O fabric is then constructed out of two or more point-to-point links. Multiple links can connect between the same two points, an implementation called bundling (e.g., bundle 1030).

Figure 11:
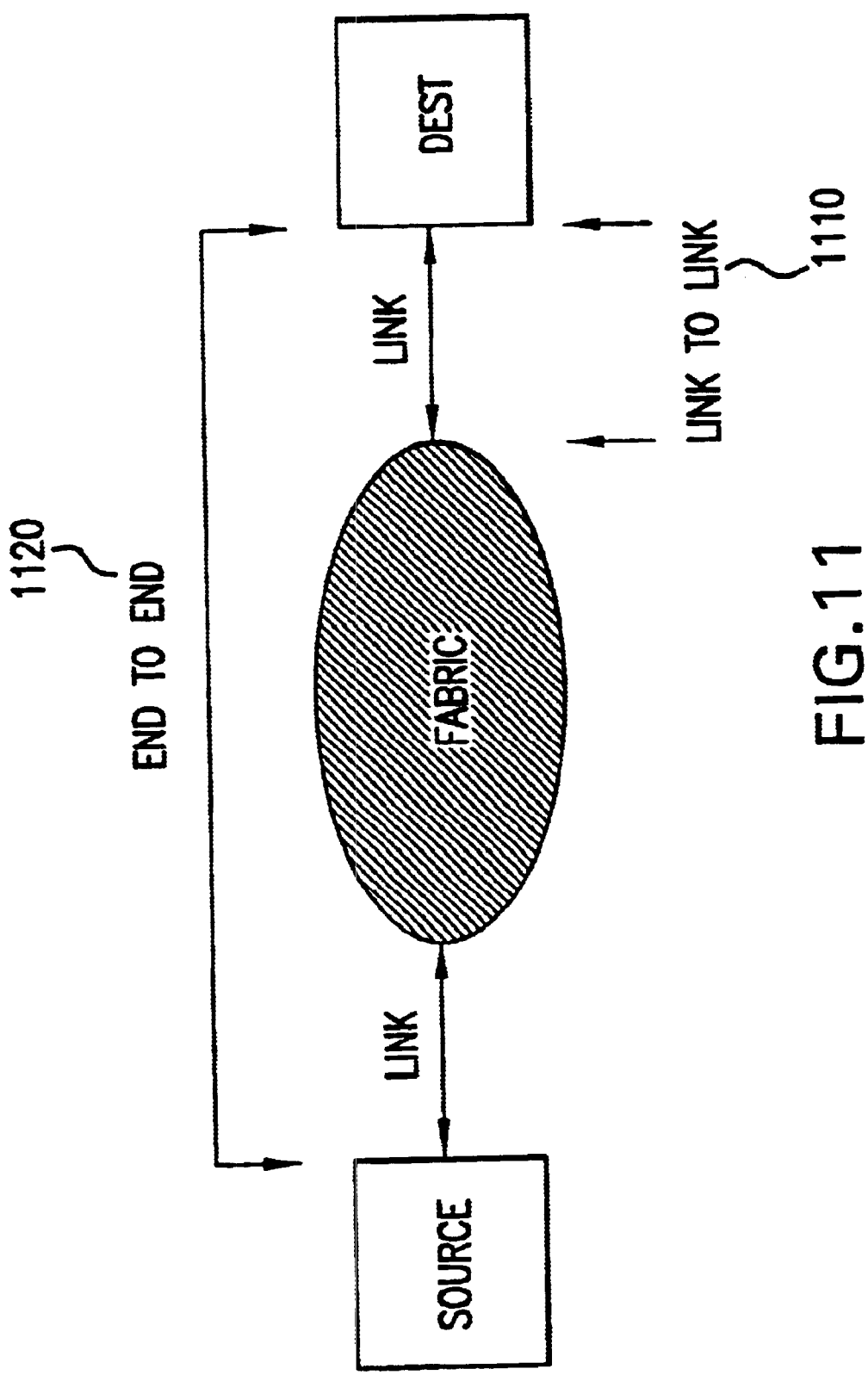
FIG. 11 illustrates the link-based protocol operation according to the present invention is applicable.

The NG I/O protocol can be used to build a reliable network. Hence, according to one exemplary embodiment of the present invention NG I/O packets will not be dropped, repeated, corrupted, or re-ordered due to network congestion or transient bit errors. Packets are sent from source to destination, which may be far apart. NG I/O converts one long trip into a series of short trips. Referring to FIG. 11, the NG I/O protocol operates link-to-link 1110, as opposed to end-to-end 1120. That is, the protocol requires acknowledgment of each packet for each link, rather than waiting until the packet reaches the termination node.

NG I/O protocol link-to-link operation features:

Data rates of up to 1.25 Gb/sec over copper wires, and 2.125 Gb/sec over optical media.

Follows Fibre Channel technology as data rates increase, including a planned increase to 4.25 GB/sec.

Bandwidth scaling as links are added.

A quick/expedient send-to-acknowledge cycle.

Frequent/multiple checks of data correctness.

Optimization for correct operation, not failure cases.

Figure 12:
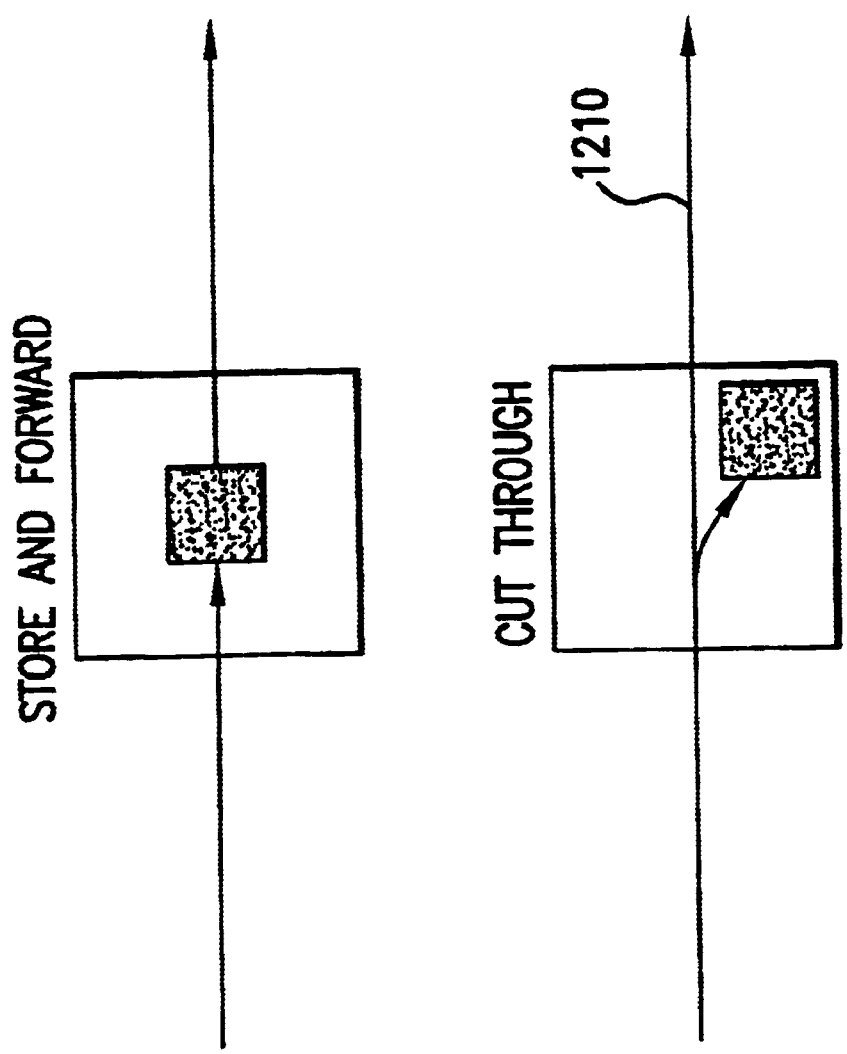
FIG. 12 illustrates store and forward routing and cut-through routing used in the present invention.

According to one exemplary embodiment of the present invention, NG I/O employs a cut-through 1210 routing technique as illustrated in FIG. 12. Like traditional "store and forward" link protocols, packets are buffered as they pass through a link interface. Cut-through minimizes the buffer size required to sustain bandwidth. Unlike traditional protocols, the cut-through link does not have to wait to capture the entire message before forwarding it on to the next link. No additional latency penalty is incurred between link-to-link transfers. Each link sends the packet onto the next link while it checks and acknowledges the packet from the previous link. Each link retains its transmitted packets until acknowledged. Flow control is credit based. Each link retries or de-allocates locally and quickly.

Network Model Stack

Figure 13:
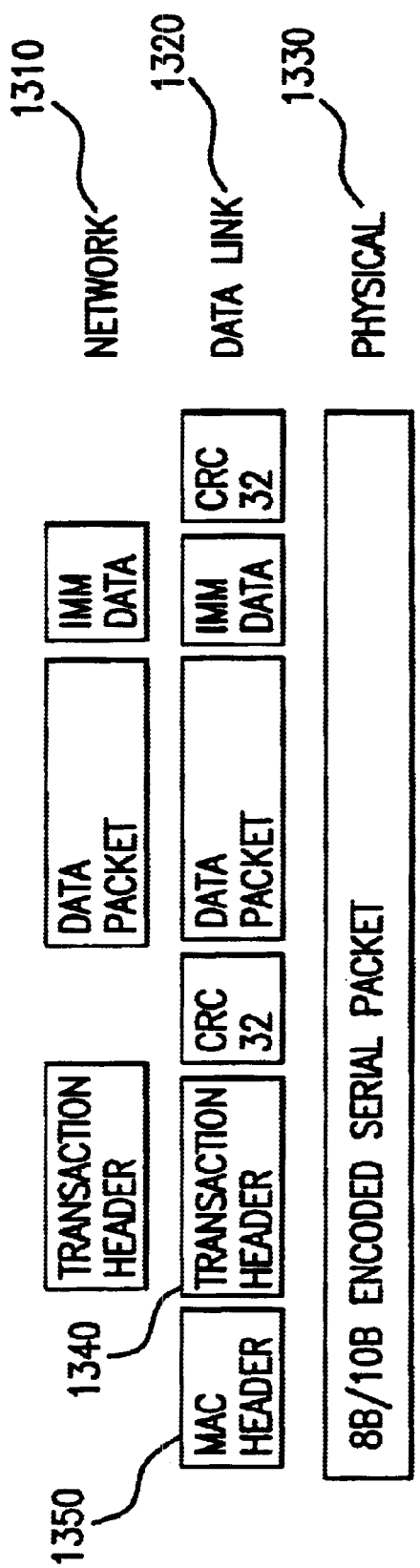
FIG. 13 illustrates NG I/O layers and packet formats according to the present invention.

To minimize design complexity, modern networks tend to use a layered architecture in which each layer in the hierarchy is a logical entity that performs certain functions. Each layer provides services for the next layer above it and shields the details of how these services are carried out from this higher layer. This hierarchical structure, or stack, performs all tasks and functions required to provide services over the network. NG I/O implements a network layer 1310, a data link layer 1320 and a physical layer 1330 as illustrated in FIG. 13.

Network Layer: The network layer completes the definition of the interaction between host and network. It accepts a transaction from a transport layer access service point. It then adds a correctly formatted transaction header, identifying the operation type and destination, to each data packet handed it by the transport layer. The network layer also provides the address that is used to steer the transaction through the fabric and passes the transaction to the NG I/O data link layer.

Data Link Layer: The data link layer accepts a transaction from the network layer access service point and creates a media access control header (MAC). The data link layer creates the CRC-32 checksums that accompany packets. The data link layer provides the final framing and encoding of packets for the physical media. The data link layer controls link layer data flow. Its responsibilities also cover synchronization, reset, and initialization. The data link layer implements the mechanisms that allow bundling, redundancy, and auto discovery. This layer also manages link-to-link acknowledges, and detects and retries transmission errors.

Physical Layer: The physical layer accepts a transaction from the data link layer access service point, buffers that transaction to match the physical interface components, and passes the transaction to the NG I/O bus. Transmit buffering requirements are a function of implementation choices (cost/performance tradeoff). Factors affecting transmit buffering requirements are queues in support of speed matching at each end of an NG I/O link, packet size, transmission speed, and link cable characteristics.

Transactions

NG I/O is expected to fully support two separate and distinct styles of transactions. Implicit transactions interact with the devices emulating a remote bus. This is called I/O pass-through mode. In specific, these transactions are intended to provide transitional support of legacy PCI devices. Explicit transactions support distributed message passing.

Implicit Transactions: As a result of the present invention, I/O pass seamlessly through the NG I/O protocol. Physical address loads and stores are supported in three operation domains: memory, I/O, and configuration. In addition, special classes of operation in support of lock and interrupt transport are provided. For load/store operations, the network layer uses the destination physical address associated with each transaction to deliver a packet to the destination. The network software layer configures the hardware to match address ranges with associated network addresses. A thin layer of hardware reads the opcode stating the transaction and destination address to direct the transaction to the destination. Fragmentation or reassembly of data is not necessary, but is also not excluded.

Explicit Transactions: For explicit communications across the NG I/O fabric, communication between nodes should be predictable and overhead be minimal. Explicit transactions are considered de-coupled or asynchronous, meaning that the initiator can go off and do other work after a transaction is sent. A initiator can choose either polling for completion, or enabling an interrupt on completion. The explicit portion of the protocol is a distributed message passing communication model. The protocol is required to support virtual addressing. The protocol supports individual network addresses for network-aware devices and intelligent fabric endpoints.

A header field is used to direct packets through the fabric. The network software layer matches send transactions to network addresses for each instance. When using explicit transactions, a destination node name address should be presented with each instance in order to deliver the transaction to the associated receive queue at the destination. The destination virtual address combined with the memory handle should be presented to the destination to deliver the transaction into the correct receive queue.

Streams larger than the NG I/O packet size, 256 bytes, are broken (segmented) into multiple packets for transmission and reassembled at the destination by the hardware implementing the network layer. NG I/O guarantees packets from the same source to the same destination will arrive in order. This greatly simplifies the identification and reassembly of data streams from packets. NG I/O operation codes identify first and last packet in a data stream.

Error Handling

Cabled networks over distance are considered a noisy/error-introducing, but not necessarily error-prone environment. Any protocol that chooses this type of media for its messages should enable the receiver to determine whether the message has been corrupted. NG I/O 256-byte data transmit packets are protected by 8B/10B-encoded redundancy and two CRC-32 checksums. There is a checksum for both the header and the data. Performance can be improved when the header has its own checksum—the header can be decoded and checked early, before the arrival of data. It there are no side effects, initiation of the message at the receiver becomes pipelined with the data reception.

CRC-32: The aim of the Cyclic Redundancy Check (CRC) error detection technique is to enable the receiver of a message to determine whether the message has been corrupted. The transmitter constructs a checksum that is a function of the message and appends it to the message. The receiver uses the same function to calculate the checksum of the received message and compares it with the appended checksum to see if the message was correctly received.

8B/10B: 8B/10B is a byte-oriented binary transmission code. This transmission code translates each source byte into a constrained, 10-bit binary sequence. The sequence is further partitioned into 5B/6B and 3B/4B subordinate blocks to limit bit-error-burst length to five decoded bits. Bit disparity, or the amount of 1's 0's, is tracked on sub-blocks. Permitted disparity on subordinate sequences is either +2, −2, or 0. 8B/10B code is particularly well-suited for serial data links. The encoding scheme provides a constant DC component, regardless of data patterns. Additional redundancy also provides for reliable clock recover and additional special control characters. Bounded disparity provides a form of error detection. If not treated properly, a cable can become an antenna. Interference from the (8B/10B narrowed) cable frequency domain is minimized by cable shielding attached to common ground at each link end point.

Retry on Transient Error: Receiving links keep track of the last successfully completed packet sequence. Each received packet is decoded and the CRC is checked. An identified transmission error generates a retry to the previous link. The retry is a negative acknowledge (NAK) of the first bad packet. This implies all previous packets were good and all subsequent packets must also be retried. The flow control is included in the MAC header and can be appended to a packet in transit or sent as its own packet, After receiving the NAK, the transmitting link restarts at the specified sequence and de-allocates previous packets. This mechanism repairs transient faults. A retry counter is available. An unsuccessful re-transmit sequence, as configured by the fabric manager, generates an exception/interrupt packet sent upstream (back to the source). In the event that the source is not available, the packet will be directed to the fabric manager. The transport layer is notified. A non-recoverable error is generated.

Persistent Error and Recovery: Each link has configurable retry and timeout counters. And when a link develops a permanent fault, failing on several retries (the amount is configurable) or failing to respond (the interval is configurable), the device shuts down the link, preventing it from carrying any further traffic. The undeliverable packet is sent back to the source with an appropriate error condition appended to the fabric control field of the MAC. When the transport layer is appraised of the problem it sends one last packet, flushing the failing path. The transport layer will then change its routing table to remove this failed path. When the flush packet returns, the transport layer knows all packets from the queue have been recovered in order. Through implementation, the transport layer may be able to map an alternative route for returned packets to their proper destination. The transport layer may employ a fabric-aware device to test the failing link status and choose to restore and re-initialize partial restricted functionality to the failed link. A transport layer could use a fabric-aware device to continually poll the failing link, re-enabling the pathway when link integrity is restored.

Flow Control

According to one exemplary embodiment of the present invention, NG I/O protocol uses link-based flow control. This means each link transmitter retains packets until such time as they are acknowledged by the link receiver. Depending on the type of acknowledge, the transmitter will then either retry or de-allocate the packets.

NG I/O flow control is credit based. At power up, each end of a link determines buffer size, deferring to the smaller implemented buffer if size is different. A transmitter will not send a packet unless buffer space at the receiver is available. Transmitter and receiver also synchronize on width of the link ID counter.

Each link transmitter assigns an ordered ID (beginning with zero) to each sent packet. The link receiver tests the checksum of each delivered packet. If the packet tests with no error, the receiver sends a positive acknowledge (ACK) back to the transmitter. Flow control is either contained in its own packet or is appended to a packet assembling for transmission back.

Some period of time can be consumed while the receiver attempts to acknowledge the transmitter. In the interests of efficiency, a receiver can ACK out-of-order to de-allocate buffer space for the named transaction and any other sequentially previous transactions outstanding at the transmitter. In exchange for this performance benefits, the receiver assumes responsibility for tracking transmit ID sequence. This audition activity reduces the opportunity for undetected packets.

In the case of negative acknowledge (NAK), the transmitter may still de-allocate for sequentially previous transactions. NAK instructs the transmitter to resend the indicated packet and any packets that have been sent since then. Each transmitter has a configurable interval timer for the link acknowledge cycle. Each transmitter has a configurable iteration counter for NAK. Rather than congest the link, a transmitter that has run through either counter is obliged to return the undeliverable packet to its source.

Link Buffering: NG I/O links support link-to-link flow control on packets. Each packet is forwarded, decoded, tested for validity, and stored by each link (in the order). Although a copy of each packet is buffered, the original packet is passed through an NG I/O interface as quickly as possible. The end result is link behavior usually described as "cut-through" routing strategy. This minimizes latency as the packet moves through the fabric. Each acknowledge or negative acknowledge returned to the transmitter de-allocates or retries the buffered packet. To sustain maximum NG I/O bandwidth each link possesses enough buffering to cover the link-to-link transmit-acknowledge cycle.

Transaction Ordering: Packets are ordered strongly while sharing the physical queue structures within each interface. The NG I/O protocol guarantees multiple packets in a given sequence from one source will arrive in order to one destination. However, even within these queues, each transaction is treated as originating from independent streams. NG I/O does not guarantee sequential transaction ordering from one source to many destinations. If separate destinations on NG I/O are expected to act in concert, initiated by NG I/O transactions, through a sideband communication channel, each transaction is followed by another with end-to-end acknowledge behavior (like a read) to guarantee proper serialization of the command sequence.

Packet Format: Referring to FIG. 13, an NG I/O packet has two headers, one prepared by the network layer called the transaction header 1340 and one prepared by the data link layer called media access control header 1350. The transaction header 1340 is assembled once at the source and disassembled once only at the destination. The media access control (MAC) header 1350 holds fabric-specific information. It is assembled, recoded, and disassembled at each link. These two headers are protected with a 32-bit CRC, which is recalculated and appended by the data link layer at each instance. The NG I/O network layer segments a data stream into packets of 256 or fewer bytes. Segmented streams are reassembled by the destination network layer. There is also an option to include an immediate data field after the data packet. These two data fields are also protected with a 32-bit CRC. The data and immediate data packets and their associated CRC-32 are created at the source and not altered until reception by the network layer at the destination.

The Network Layer: The network layer adds a transaction header, identifying the operation type and destination, to each data packet handed to it by the transport layer.

This result is this format of the data as it distributes serially down to the data link layer. The data field can be from zero to 256 bytes.

| Transaction Header 11 bytes | Data 0–256 bytes | Immediate Data 4 bytes |
| --- | --- | --- |

The Transaction Header: According to one exemplary embodiment of the present invention, the format for the transaction header for implicit (I/O Pass-through) mode is:

| opcode[7:0] | be[15:0] | a[63:2] | lock[1:0] |
| --- | --- | --- | --- |

According to one exemplary embodiment of the present invention, the format for the transaction header for explicit (message passing) mode is:

| opcode[7:0] | vi[15:0] | a[63:0] |
| --- | --- | --- |

According to one exemplary embodiment of the present invention, the fields of the transaction header are defined as follows:

| | |
|---|---|
| opcode | Defines the transaction type and determines how the rest of the transaction header is to be interpreted. All undefined opcodes are reserved. |
| be | Byte enables for the first 16 bytes of the data packet. Supports a prologue, beginning of a data transfer up to the next boundary, up to 16 bytes. Does not directly support an epilogue, end of a data transfer past the last 16-byte boundary. Epilogue support is inferred from the MAC length field. In I/O pass-through mode, there is a limitation of one packet per TID. The packet fits consecutively within sixteen 16-byte partitions. This implies that an unaligned data packet may be further constrained in length than 256 bytes. |
| vi | Identifies the virtual interface queue/instance at the destination. |
| a | Address - 64-bit addressing is supported. |
| lock | Identifies a special I/O pass through transaction. |

| Lock | Definition |
|---|---|
| 00 | no lock |
| 01 | lock request |
| 10 | from source, lock in progress from destination, lock grant |
| 11 | unlock |

Opcode Reference: In one exemplary embodiment, the opcodes and corresponding transactions are assigned as follows:

| Opcode | Transaction |
|---|---|
| 00000000 | Memory Read |
| 00000001 | Memory Write |
| 00000010 | I/O Read |
| 00000011 | I/O Write |
| 00000110 | Read Response |
| 00000111 | Write Response |
| 00001000 | Reserved |
| 00001000 | Reserved |
| 00010001 | Configuration Read |
| 00100000 | Configuration Write |
| 00100000 | Flow Control |
| 01xx0000 | Send |
| 01xx1000 | Send Immediate |
| 01xx0010 | RDMA Read Request |
| 01xx1010 | RDMA Read Request Immediate |
| 01xx0011 | RDMA Write |
| 01xx1011 | RDMA Write Immediate |
| 01xx0110 | RDMA Read Response |
| 01xx1110 | RDMA Read Response Immediate |
| Xx1xxxxx | First Packet Of A Large DMP Transfer |
| Xxx1xxxx | Last Packet Of A large DMP Transfer |
| 1xxxxxxx | Reserved |

According to one exemplary embodiment of the present invention, the specific bit definitions of an opcode are:

| reserved | reb# | flow cntl | configure | reserved | response | mi/o# | w/r# |
|---|---|---|---|---|---|---|---|
| reserved | dmp | first | last | immediate | response | rdma | w/r# |

Immediate Data Field: According to one exemplary embodiment of the present invention, Bit 3 in the opcode field is defined as the immediate bit. This describes a special data case. In this special case, an additional immediate data field follows the data packet. This immediate data is specialized in that there is no transmitted address associated with it. The received instance places this immediate data directly into its receive descriptor.

The Data link layer: According to one exemplary embodiment of the present invention, the Media Access Control header is added to each transaction by the data link layer. The result is this format and order of data as the transaction is passed serially down to the physical layer:

| MAC Header 11 bytes | Transaction 11 bytes | Header CRC 4 bytes | Data 0–256 bytes | Immediate Data 4 bytes | Data CRC 4 bytes |
|---|---|---|---|---|---|

MAC Header—Media Access Control: According to one exemplary embodiment of the present invention, this header is assembled, disassembled, and usually modified at each intermediate link. To save time and bandwidth, local link control can be appended to the MAC header of a transaction in progress.

According to one exemplary embodiment of the present invention, the format of the MAC header is:

| version [3:0] | pri/type [3:0] | src/dest [31:0] | fabcnt [7:0] | length [8:0] | reqid [9:0] | ack/nak# | cmpid [9:0] | reserve [9:0] |
|---|---|---|---|---|---|---|---|---|

According to one exemplary embodiment of the present invention, the fields of the MAC header are as follows:

version Of the NG I/O protocol

| Version | Definition |
|---|---|
| 0000 | Initial Implementation |
| 0001 | Reserved for Future Use |
| ... | Reserved for Future Use |
| 1111 | Reserved for Future Use | priority/type Of the transaction. This field can be used to identify different priority transactions, virtual channels, or in support of other network protocols over NG I/O.

| Pri/Type | Definition |
|---|---|
| 0000 | Priority Zero Packet (Lowest) |
| 0001 | Priority One Packet |
| 0010 | Priority Two Packet |
| 0011 | Priority Three Packet (Highest) |
| 0100 | Reserved/TBD |
| ... | Reserved/TBD |
| 1111 | Reserved/TBD |

| | |
|---|---|
| src/dest | Defines route or endpoints of the transaction through the fabric. Each source and destination is unique for a network total of 65,635 endpoints. This field may have different formats depending on NIC and fabric implementations. |
| fabcntl | Fabric control, identifies special transactions such as management frames for switches within the fabric. Implementation dependent. |
| length | Number of bytes units in data packet, irrespective of byte marks. This number includes the immediate data field, if any. |

-continued

| | |
|---|---|
| reqid | Request ID number for transactions, also sequence numbers for associated port. |
| ack/nak# | Defines how the cmpid is being acknowledged. |
| cmpid | ID number of the last packet acknowledged on that port. |

What is claimed is:

1. A method to transfer data across a fabric in a system area network including a plurality of links using a link-to-link protocol, said method comprising:

transmitting the data in a plurality of packets from link-to-link;

retaining each packet in a buffer at a transmitter side of a link until receiving either an acknowledgement indicating that said each packet was successfully received at a receiving side of a link, or an error indication that a received version of said each packet included at least one error, while simultaneously transmitting additional packets to the receiving side of the link;

using a single negative acknowledgement to indicate that a packet associated with the negative acknowledgement as received by the receiving side of the link includes at least one error and to simultaneously indicate that all previous packets received prior to the packet associated with the negative acknowledgement were received correctly at the receiving side of the link; and either appending flow control data to a packet being assembled for transmission in an opposite direction to a data flow being controlled by the flow control data or transmitting flow control data as separate packets from the receiver to the transmitter.

2. The method according to claim 1, further comprising:
indicating successful receipt of all packets between a last acknowledged packet and a particular packet by sending a single acknowledgement from the receiving side of a link to the transmitting side of a link.

3. The method according to claim 1, further comprising:
de-allocating a particular packet in the buffer at the transmitter side of the link upon receipt of an acknowledgement associated with said particular packet; and
de-allocating any other packets in the buffer between said particular packet and a last acknowledged packet.

4. The method according to claim 1, further comprising:
tracking a transmit ID sequence at the receiver.

5. The method according to claim 1, further comprising:
de-allocating all buffered packets following a packet associated with the negative acknowledgement, and retransmitting all packets from the packet associated with the negative acknowledgement including the packet associated with the negative acknowledgement.

6. A system for transferring data across a fabric in a system area network including a plurality of links using a link-to-link protocol, comprising:

a transmitter, coupled to the network, to
transmit the data in a plurality of packets, and
retain each packet in a buffer until receiving either an acknowledgement indicating that said each packet was successfully received, or an error indication that a received version of said each packet included at least one error, while simultaneously transmitting additional packets; and a receiver, coupled to the network, to
use a single negative acknowledgement to indicate that a received packet associated with the negative acknowledgement includes at least one error and to simultaneously indicate that all previous packets received prior to the packet associated with the negative acknowledgement were received correctly, and
either append flow control data to a packet being assembled for transmission in an opposite direction to a data flow being controlled by the flow control data or transmit flow control data as separate packets to the transmitter.

7. The system according to claim 6, wherein the receiver is to indicate successful receipt of all packets between a last acknowledged packet and a particular packet by sending a single acknowledgement to the transmitter.

8. The system according to claim 6, wherein the transmitter is to de-allocate a particular packet in the buffer upon receipt of an acknowledgement associated with said particular packet and de-allocate any other packets in the buffer between said particular packet and a last acknowledged packet.

9. The system according to claim 6, wherein the receiver is to track a transmit ID sequence.

10. The system according to claim 6, wherein the transmitter is to de-allocate all buffered packets following a packet associated with the negative acknowledgement and retransmit all packets from the packet associated with the negative acknowledgement including the packet associated with the negative acknowledgement.

* * * * *